(12) United States Patent
Bissell

(10) Patent No.: US 6,623,602 B1
(45) Date of Patent: Sep. 23, 2003

(54) METHOD FOR RECLAIMING VOLATILE PRODUCTS AND NON-VOLATILE RESIDUE

(76) Inventor: G. Thomas Bissell, 809 W. River Dr., Temple Terrace, FL (US) 33617

(*) Notice: Subject to any disclaimer, the term of this patent is extended or adjusted under 35 U.S.C. 154(b) by 0 days.

(21) Appl. No.: 09/433,471

(22) Filed: Nov. 4, 1999

Related U.S. Application Data

(60) Provisional application No. 60/107,447, filed on Nov. 6, 1998.

(51) Int. Cl.⁷ .................... C10B 47/00; C10B 47/12; C10B 51/00; C10B 57/04
(52) U.S. Cl. .................... 201/25; 201/13; 201/14; 202/96; 202/99; 202/117; 202/119; 202/208; 585/241
(58) Field of Search ............... 202/84, 86, 87, 202/96, 99, 102, 105, 108, 110, 117, 119, 208; 201/25, 10, 12, 13, 14, 19, 26, 28, 32, 33, 35, 36, 40, 41, 2.5; 585/241

(56) References Cited

U.S. PATENT DOCUMENTS

| 4,036,152 A | * | 7/1977 | Bright ................ 110/191 |
| 4,235,676 A | | 11/1980 | Chambers ............. 423/449.7 |
| 4,647,443 A | | 3/1987 | Apffel ................. 202/118 |
| 4,686,008 A | * | 8/1987 | Gibson ................. 202/118 |
| 4,908,104 A | * | 3/1990 | Loomans et al. ......... 201/25 |
| 5,167,772 A | * | 12/1992 | Parker, Sr. ............ 202/105 |
| 5,427,022 A | * | 6/1995 | Gardner ................ 100/214 |
| 5,453,164 A | * | 9/1995 | Breu .................. 202/136 |
| 5,504,267 A | * | 4/1996 | Platz .................. 585/241 |

* cited by examiner

Primary Examiner—Jerry D. Johnson
Assistant Examiner—Alexa Ann Doroshenk
(74) Attorney, Agent, or Firm—Frijouf, Rust & Pyle, P.A.

(57) ABSTRACT

An improved method is disclosed for reclaiming volatile products and non-volatile residue through the pyrolysis of a polymeric material comprising placing the polymeric material in a reactor and establishing an oxygen deficient atmosphere in a reactor. The polymeric material is simultaneously compressed and heated to a temperature sufficient to pyrolyze the polymeric material to produce volatile products and non-volatile residue. The volatile products and non-volatile residue are subsequently removed from the reactor and collected.

10 Claims, 16 Drawing Sheets

METHOD FOR RECLAIMING VOLATILE PRODUCTS AND NON-VOLATILE RESIDUE

CROSS-REFERENCE TO RELATED APPLICATIONS

This application claims benefit of U.S. Patent Provisional application Ser. No. 60/107,447 filed Nov. 6, 1998. All subject matter set forth in provisional application Ser. No. 60/107,447 is hereby incorporated by reference into the present application as if fully set forth herein.

BACKGROUND OF THE INVENTION

1. Field of the Invention

This invention relates to reclaiming pyrolysis products and more particularly to reclaiming the volatile products and non-volatile residue from the pyrolysis of polymeric materials.

2. Prior Art Statement

The massive increase in the number of rubber automobile tires produced annually, has resulted in 60–70% of the available rubber being used in automobile tires. The large number of tires produced annually has resulted in a large number of discarded tires.

A typical automobile tire is fabricated from layers (or plies) of a combination of rubber compounds reinforced with carbon black, synthetic fibers or steel wire. Every pound of rubber used in tire treads requires at least one-half pound of carbon black, with the casing requiring a slightly lower ratio. Additionally, a variety of additives are included in the tire formula.

Antioxidants are added to rubber compositions to resist the action of oxygen. Antioxidants are among a group of materials known as antidegradants, which include all materials intended to resist the deterioration of rubber. The amount of antioxidant used per pound of both natural and synthetic rubber has steadily risen. These effects have exacerbated the environmental pollution problems resulting from discarded automobile tires. Due to the nature of automobile tire rubber formulations, automobile tires tend to be substantially non-biodegradable.

Therefore, discarded tires result in an accumulation problem. In an effort to reduce the accumulation and to prevent environmental pollution some passive disposal methods have been utilized to recycle a small number of tires. These include making artificial reefs by placing the discarded tires as seeds for the reefs in an undersea location.

Reclaimed rubber has become an important element in the rubber industry, and is used whenever applications do not require premium grade rubber. Internal recycling has become a standard part of the process in most rubber processing facilities. However, the cost of recycling old or worn out tires has thus far generally exceeded the value of the reclaimed material.

Used rubber was formerly burned, but this technique has been curtailed due to atmospheric pollution resulting from this activity. Destructive distillation of scrap rubber products has been used in recycling processes, and may allow reclamation of valuable rubber chemicals. Liquid oil used in other chemicals is a primary product of distillation. Combustible gas which may be used as a fuel and carbonaceous residue used as a filter char or a binder in concrete or asphalt roadways make up the balance of products from destructive distillation.

The environmental concerns resulting from the vast number of discarded tires has not been adequately addressed by the prior art. Destructive distillation of scrap rubber products has shown some promise but is not rapid enough for large throughput.

Pyrolysis, the incineration of an object in an oxygen deficient atmosphere which results in a chemical change produces products similar to those achieved through destructive distillation of automobile tires, has shown considerable promise in solving the current problem.

A problem remaining in the pyrolysis process of a material having a high percentage of inorganic material in an organic matrix, such as an automobile tire has not been adequately addressed in the prior art. As pyrolysis progresses from the surface of the material an insulating effect begins as the inorganic material and residue reduce the thermal transfer rate to the remaining organic material internal to the material being pyrolyzed.

The present invention overcomes these problems by applying heat in direct contact with the surfaces of the material to be pyrolyzed and as the process progresses, compression of pyrolysis residue is achieved thereby maintaining substantially constant contact with the organic material remaining.

Therefore, it is an object of the present invention to provide an improved apparatus and method for reclaiming volatile products and non-volatile residue through the pyrolysis of a polymeric material.

Another object of this invention is to provide an improved environmentally non-destructive apparatus and method for reclaiming volatile products and non-volatile residue through the pyrolysis of a polymeric material.

Another object of this invention is to provide an improved apparatus and method for reclaiming volatile products and non-volatile residue through the pyrolysis of a polymeric material with substantially no environmental release of atmospheric pollutants.

Another object of this invention is to provide an improved apparatus and method for reclaiming volatile products and non-volatile residue through the pyrolysis of a polymeric material which retains a portion of the pyrolysis products for use in the pyrolysis process.

Another object of this invention is to provide an improved apparatus and method for reclaiming volatile products and non-volatile residue through the pyrolysis of a polymeric material which retains a portion of the volatile products for providing energy for operating the process.

Another object of this invention is to provide an improved apparatus and method for reclaiming volatile products and non-volatile residue through the pyrolysis of a polymeric material which is efficient and economical to operate.

Another object of this invention is to provide an improved apparatus and method for reclaiming volatile products and non-volatile residue through the pyrolysis of a polymeric material in which the process can be automated thereby requiring minimum human intervention into the process.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved method and apparatus for reclaiming volatile products and non-volatile residue through the pyrolysis of a polymeric material, comprising placing the polymeric material in a reactor and establishing an oxygen deficient atmosphere in a reactor. The polymeric material is simultaneously compressed and heated to a temperature sufficient to pyrolyze the polymeric material.

In a more specific embodiment of the invention, the invention relates to an improved method and apparatus for reclaiming volatile products and non-volatile residue through the pyrolysis of an inorganically filled polymeric object.

In one embodiment of the invention, establishing an oxygen deficient atmosphere in a reactor comprises displacing oxygen in a reactor by introducing a substantially non-reactive gas. The establishment of the oxygen deficient atmosphere in a reactor may comprise displacing oxygen in a reactor by introducing carbon dioxide gas. In the alternative, the step of establishing the oxygen deficient atmosphere in a reactor may comprise displacing oxygen in a reactor by introducing nitrogen gas in the reactor.

Preferably, the polymeric material is simultaneously compressed and heated to a temperature sufficient to pyrolyze the polymeric material by applying a substantially continuous mechanical pressure on the polymeric material during the reduction of the volume of the polymeric material during the continuous pyrolysis thereof. In one example, the polymeric material is simultaneously compressed by compressing the polymeric material with a mechanical pressure between 400 pounds per square inch and 600 pounds per square inch heated to a temperature sufficient to pyrolyze the polymeric material. In this example, the polymeric material is simultaneously compressed and heated to a temperature of one thousand two hundred degrees Fahrenheit, sufficient to pyrolyze the polymeric material.

The volatile products and non-volatile residue produced from the pyrolysis of the polymeric material are removed from the reactor and collected for further use. A portion of the volatile pyrolysis products residue produced from the pyrolysis of the polymeric material may be retained within the reactor for maintaining the oxygen deficient atmosphere in the reactor. A portion of the volatile products are removed from the reactor and the residual non-volatile pyrolysis residue is collected for further use.

In another embodiment of the invention, the invention relates to an improved apparatus and method for the reclaiming of volatile products and non-volatile residue through the pyrolysis of a polymeric material, comprising an input chamber defining an input for the polymeric material, and a reactor for receiving the polymeric material. The reactor communicates with the input chamber, and an input gate for isolating the input chamber from the reactor. A mechanism is provided to establish an oxygen deficient atmosphere in the reactor. An apparatus in the reactor is provided to simultaneously apply mechanical pressure and heat to the polymeric material, providing a temperature sufficient to pyrolyze the polymeric material. An output port communicating with the reactor is provided for removing the volatile pyrolysis products from the reactor, and a residue chamber communicates with the reactor for collecting the residual non-volatile pyrolysis residue. An output gate isolates the reactor from the residue chamber.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
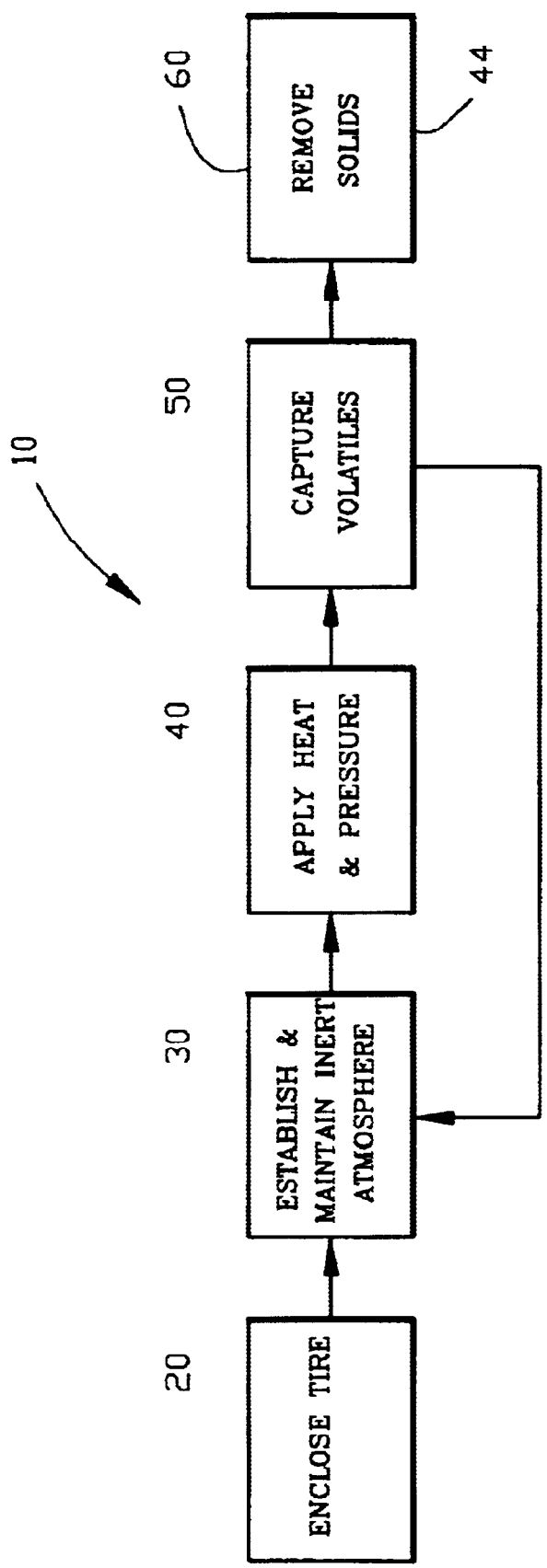
FIG. 1 is a block diagram of the process for reclaiming volatile product and non-volatile residue through the pyrolysis of a polymeric material of the present invention.

FIG. 1 is a block diagram of the process 10 for reclaiming volatile product and non-volatile residue through the pyrolysis of a polymeric material of the present invention. The process 10 of the present invention may be used with virtually any type of polymeric material. However, the process 10 of the present invention is especially suited for use with inorganically filled polymeric objects such as rubber tire 14 or the like.

The process 10 of the present invention comprises the step 20 of enclosing the rubber tire 14 within a reactor 22. The process 10 includes the step 30 of establishing an oxygen deficient atmosphere in the reactor 22. The step 30 of establishing an oxygen deficient atmosphere may be accomplished by displacing the oxygen within the reactor 22 with a substantially non-reactive gas.

The process 10 continues with the step 40 of simultaneously compressing and heating the rubber tire 14 to a temperature sufficient to pyrolyze the rubber tire 14 to produce volatile products 42 and non-volatile residue 44. The step 40 of simultaneously compressing and heating the rubber tire 14 includes applying a substantially continuous mechanical pressure on the rubber tire 14 during the reduction of the volume of the rubber tire 14 through the continuous pyrolysis thereof. Preferably, a mechanical pressure between 400 pounds per square inch and 600 pounds per square inch may be applied to the rubber tire 14.

The step 40 of simultaneously compressing and heating the rubber tire 14 includes heating the rubber tire 14 to a temperature in excess of seven hundred degrees Fahrenheit (700° F.) to achieve the pyrolysis of the rubber tire 14.

The process 10 includes removing the volatile products 42 and non-volatile residue 44 from the reactor 22. In this example of the invention, the process 10 includes the step 50 of capturing the volatile products 42 from the reactor 22. In a preferred embodiment of the invention, the step 50 of removing a portion of the volatile products 42 from the reactor 22 includes the step 52 of maintaining a portion of the volatile pyrolysis products 42 within the reactor 22 for maintaining the oxygen deficient atmosphere in the reactor 22. The step 52 of maintaining a portion of the volatile pyrolysis products 42 within the reactor 22 is indicated by the arrow 52.

The process 10 includes the step 60 removing the non-volatile residue 44 from the reactor 22. Preferably, the non-volatile residue 44 is allowed to cool in an accumulator prior to removal for preventing oxidation of the non-volatile residue 44.

Figure 2:
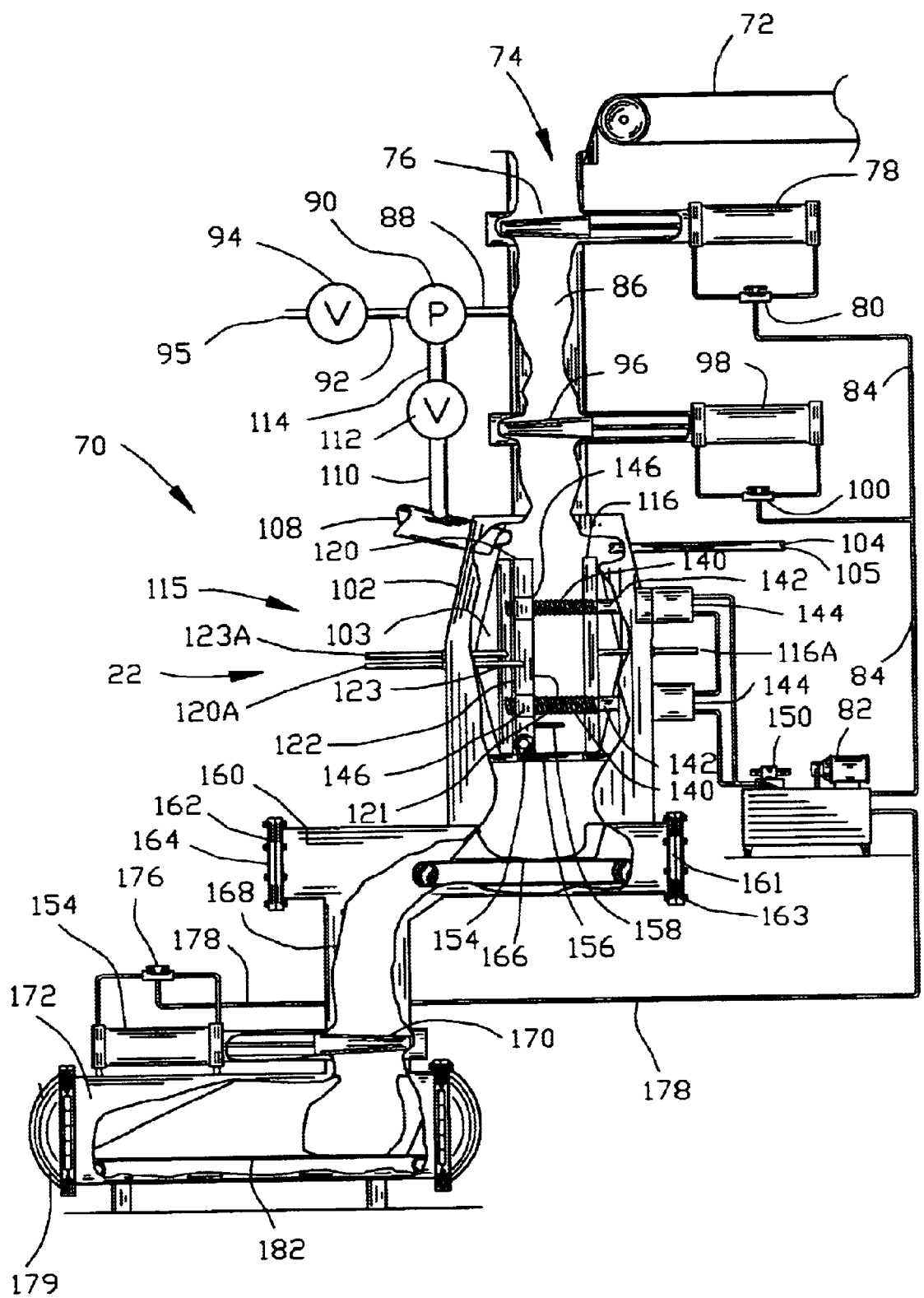
FIG. 2 is a partially cutaway side view of an apparatus for preforming the process of FIG. 1.

FIG. 2 is a partially cutaway side view of an apparatus 70 suitable for carrying out the process 10 set forth in FIG. 1. The apparatus 70 comprises an input conveyer 72 for transporting a rubber tire 14 (not shown) to an input stage 74. An input chamber gate 76 is moveable between an open and a closed position. In this example, the input chamber gate 76 is moved by a hydraulic operator 78 which is controlled by a controller valve 80. The controller valve 80 diverts hydraulic fluid under pressure from a hydraulic reservoir and pump assembly 82 through a hydraulic line 84. Alternately, an air or an electrically operator may be used to move the input chamber gate 76.

When input chamber gate 76 is moved into the closed position, the input stage 74 is isolated from an input chamber 86. When the input chamber gate 76 is moved into an open position, the input stage 74 communicates with the input chamber 86. The input chamber 86 in combination with the input chamber gate 76 defines an airlock input of the apparatus 70 for receiving the rubber tire 14.

A vacuum line 88 interconnects the input chamber 86 with a vacuum pump 90. A vacuum pump output line 92 communicates with the vacuum pump 90 and a shut off solenoid valve 94. When the vacuum pump 90 is activated and the solenoid valve 94 is opened, air from the input chamber 86 is evacuated through the vacuum line 88 by the vacuum pump 90. The air is discharged by the vacuum pump 90 through vacuum pump output line 92 and the shut off solenoid valve 94 to be expelled to the atmosphere through a discharge line 95.

A reactor input gate 96 has an opened and a closed position. When the reactor input gate 96 is moved into the closed position, the input chamber 86 is isolated from the reactor 22. When the reactor input gate 96 is moved into the opened position, the input chamber 86 communicates with the reactor 22. In this example, the reactor input gate 96 is moved by a hydraulic operator 98. The hydraulic operator 98 is controlled by a controller valve 100. The controller valve 100 diverts hydraulic fluid under pressure from the hydraulic reservoir and pump assembly 82 through the hydraulic line 84. Alternately, an air or an electrically operator may be used to move the reactor input gate 96.

The reactor 22 comprises a reactor shroud 102 defining an internal volume 103 of the reactor 22. As will be described in greater detail hereinafter, the internal volume 103 of the reactor 22 is adapted for receiving a rubber tire 14 for pyrolyzation. Preferably, the reactor shroud 102 provides a vapor barrier and thermal insulator for the pyrolysis 50 process.

A purging mechanism 104 is provided for establishing an oxygen deficient atmosphere within the internal volume 103 of the reactor 22. A purge line 105 communicates with the internal volume 103 of the reactor 22 and an inert gas source (not shown) for purging air from the internal volume 103 of the reactor 22. The inert gas sources may include carbon dioxide, nitrogen or the like.

A vapor withdrawal port 108 is connected to the internal volume 103 of the reactor 22. A vacuum inlet line 110 and a reactor vacuum solenoid valve 112 interconnect the vapor withdrawal port 108 with the vacuum pump 90. When the vacuum pump 90 is activated and the solenoid valve 112 is opened, the vacuum pump 90 evacuates volatile pyrolysis products 42 from the input chamber 86 through a vapor withdrawal port 108 and through the vacuum inlet line 110 and the reactor vacuum solenoid valve 112.

Initially, the vacuum pump 90 evacuates air from the internal volume 103 of the reactor 22 by opening the reactor input gate 96 during the evacuation of the input chamber 86. Thereafter, the purging mechanism 104 fills the internal volume 103 of the reactor 22 with an inert gas.

In addition, the vapor withdrawal port 108 communicates with the internal volume 103 of the reactor 22 for removing volatile pyrolysis products from the reactor internal volume 103 of the reactor 22. Volatile pyrolysis products removed from the internal volume 103 of the reactor 22 may be further processed as desired. Typical further processing includes condensation and collection of liquids and collection of gases for possible use in the process 10. In one example, the combustible gases collected from the pyrolyzation process may be burned to preheat the tires 14 to be pyrolyzed in the process 10. In another example, the combustible gases collected from the pyrolysation process may be burned to generate electricity for powering the apparatus 70.

The apparatus 70 is provided with a heated compression assembly 115 located within the reactor 22 for simultaneously applying mechanical pressure and heating the rubber tire 14 to a temperature sufficient to pyrolyze the rubber tire 14.

Figure 3:
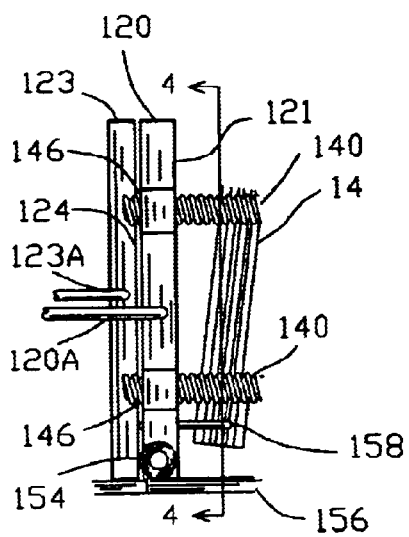
FIG. 3 is a detail end view of a heated platens.
Figure 4:
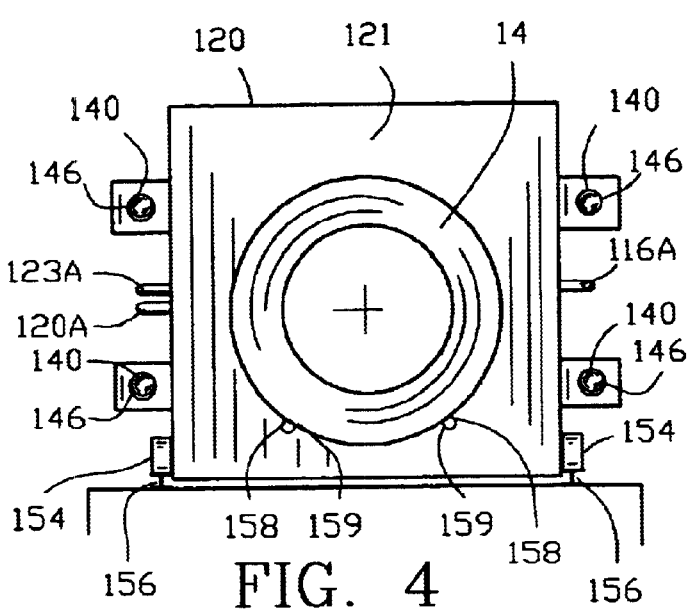
FIG. 4 is a cross-section view along line 4—4 of FIG. 3.
Figure 5:
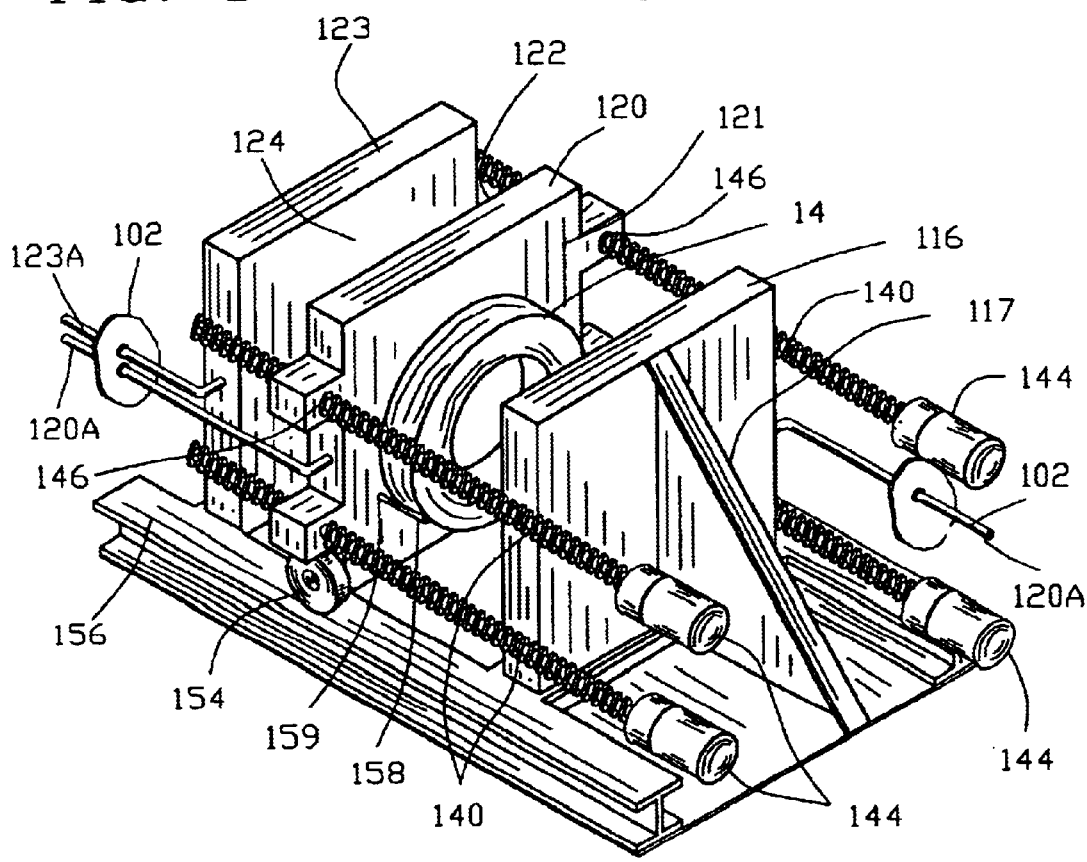
FIG. 5 is an isometric view of the moveable heated platen assembly including the jackscrews and hydraulic motor operators.

FIGS. 3–5 are detailed views of the heated compression assembly 115 of FIG. 2. The heated compression assembly 115 comprises a first fixed platen 116 having a first non-moveable compression and heating surface 117 for simultaneously applying pressure and heat to the rubber tire 14. A first rigid support frame assembly 118 is provided to support the first fixed platen 116.

A moveable platen 120 has a first side 121 and a second side 122. Each of the first and second movable sides 121 and 122 of the moveable platen 120 is a compression and heated surface for simultaneous applying pressure and heat to the rubber tire 14.

A second fixed platen 123 comprises a second non-moveable compression and heated surface 124 for simultaneously applying pressure and heat to the rubber tire 14. A second rigid support frame assembly is provided to support the second fixed platen 123.

The motion of the moveable platen 120 in a first direction moves the first side 121 of moveable platen 120 into proximity to the first non-moveable compression and heated surface 117 of the first fixed platen 116 to simultaneously apply mechanical pressure and heat to a rubber tire 14 (not shown).

The motion of the moveable platen 120 in a second direction moves the second side 122 of moveable platen 120 into proximity to the second non-moveable compression and heated surface 124 of the second fixed platen 123 to simultaneously apply mechanical pressure and heat to a rubber tire 14 (not shown).

The movement of moveable platen 120 is accomplished by the rotation of a plurality of jackscrews 140 affixed to rotatable shafts 142 of hydraulic motors 144. The threaded jackscrews 140 extend through corresponding threaded apertures 146 through the moveable platen 120. A clockwise rotation of jackscrews 140 results in movement of the moveable platen 120 in a direction approaching the first fixed platen 116. A counterclockwise rotation of the jackscrews 140 results in movement of the moveable platen 120 in a direction approaching the second fixed platen 123.

An electrical conduit 116A and 123A extend through the reactor shroud 102 of the reactor 22 for providing electrical power to the resistive heating elements internal the first and second fixed platen 116 and 123. An electrical conduit 120A slidably extends through the reactor shroud 102 of the reactor 22 for providing electrical power to the resistive heating elements internal the moveable platen 120.

The rotation of the hydraulic motors 144 is powered by the hydraulic reservoir and pump assembly 82. The direction of rotation of hydraulic motors 144 is achieved by a hydraulic motor controller 150 directing flow of the hydraulic fluid through lines 152.

The moveable platen 120 is provided with support and guide wheels 154 which traverse a rigid guide track 156. A plurality of alignment pins 158 are provided for aligning a rubber tire in a position relative to the moveable platen 120 for the pyrolysis process. The alignment pins 158 are slidably mounted and extend through a plurality of apertures 159 in moveable platen 120. Although only two alignment pins 158 have been shown, it should be appreciated that the alignment pins 158 may be arranged in various patterns for accommodating for various sizes of tires.

A discharge chamber 160 extends between a first and a second end 161 and 162. The first end 161 of the discharge chamber 160 communicates with reactor 22 to receive non-volatile pyrolysis residue 44 from reactor 22. The first and second ends 161 and 162 of the discharge chamber 160 supports flanges 163 and 164 for accessing the interior of the discharge chamber 160. A discharge conveyer 166 is disposed within the discharge chamber 160. The first end 161 of the discharge chamber 160 communicates with the discharge conveyer 166 to receive the non-volatile pyrolysis residue 44 from the reactor 22.

The discharge chamber 160 communicates with an accumulator 168 disposed in proximity to the second end 162 of the discharge chamber 160. The accumulator 168 comprises a pit for accumulating and cooling the non-volatile pyrolysis residue 44 from the pyrolysis of a rubber tire 14 (not shown).

A discharge gate 170 having an opened and a closed position. When the discharge gate 170 is moved into the closed position, the accumulator 168 is isolated from a residue removal chamber 172. When the discharge gate 170 is moved into the opened position, the accumulator 168 communicates with the residue removal chamber 172. Preferably, the discharge gate 170 is moved by a hydraulic operator 174 which is controlled by a controller valve 176. The controller valve 176 diverts hydraulic fluid under pressure from hydraulic reservoir and pump assembly 82 through a hydraulic line 178. Alternately, an air or an electrically operator may be used to move the discharge gate 170.

The residue removal chamber 172 comprises a cylinder having hinged end bells 179 which may be opened for removal of cooled residue from the pyrolysis of a rubber tire 14 (not shown). A secondary conveyor 182 is located within removal chamber 172 for directing pyrolysis residue from the residue removal chamber 172.

FIGS. 7–15 are partially cutaway side views of the apparatus 70 of FIGS. 2–6 for preforming the process of FIG. 1. Although the process of the present invention shown in FIGS. 7–15 are shown as a specific sequence, it should be understood that this sequence is made only by way of example and that numerous changes in the details of construction and the combination and arrangement of parts may be resorted to without departing from the process 10 of the present invention.

As shown in FIG. 2, the vacuum pump 90 is activated and the solenoid valve 94 is opened to evacuate air from the input chamber 86. The reactor input gate 96 is opened for enabling the vacuum pump 90 to evacuate air from the internal volume 103 of the reactor 22. The vacuum pump 90 discharges the air from the vacuum pump output line 92 and the shut off solenoid valve 94 to expel the air to the atmosphere through discharge line 95. A purging mechanism 104 is provided for establishing an oxygen deficient atmosphere within the internal volume 103 of the reactor 22. The purging mechanism 104 directs an inert gas into the internal volume 103 of the reactor 22.

Figure 7:
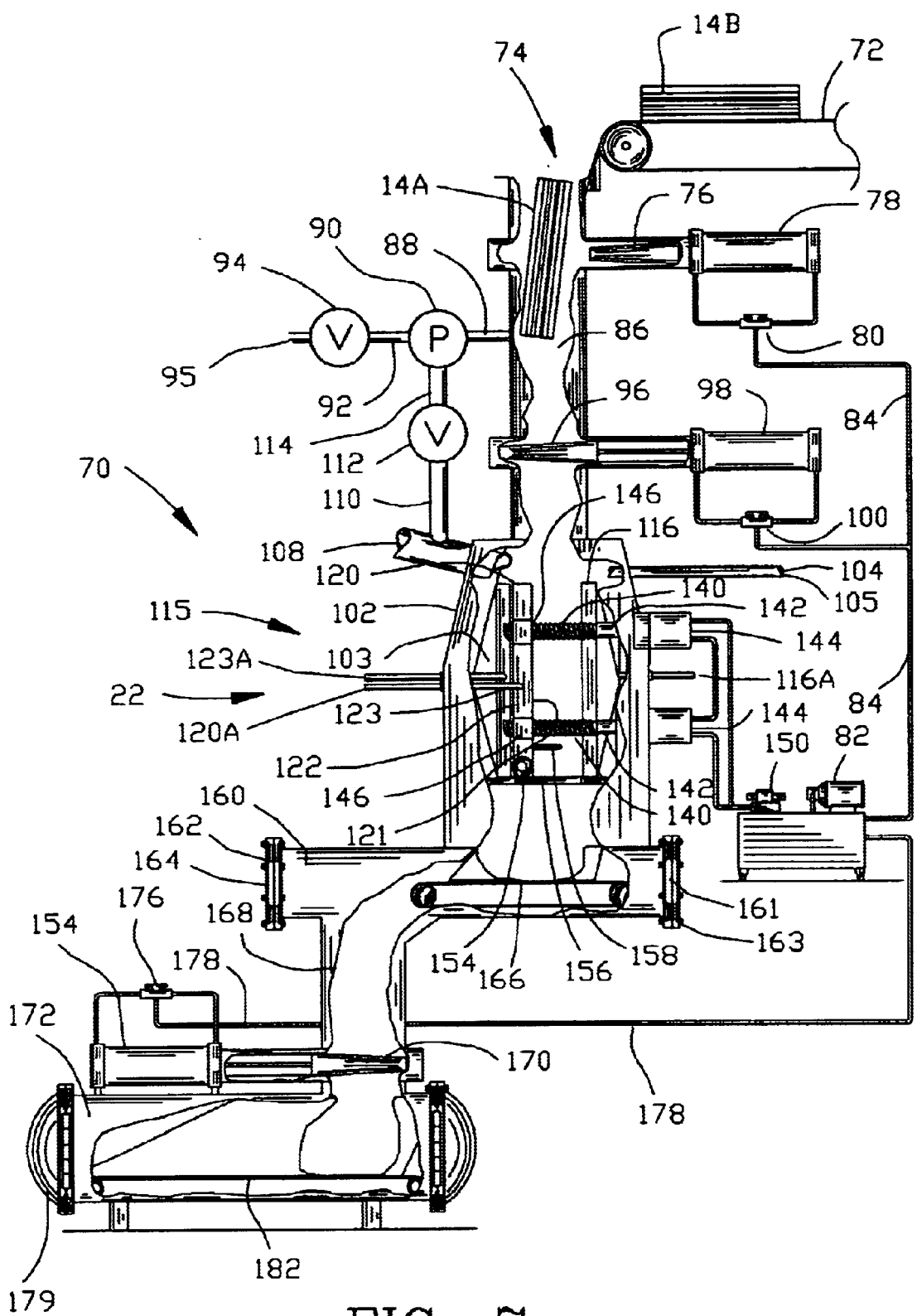
FIG. 7 is a partially cutaway side view of the apparatus illustrating a first tire entering an input chamber through an input chamber gate and a second tire on an input conveyor.

FIG. 7 illustrates the reactor input gate 96 being closed and the input chamber gate 76 being opened to vent to the atmosphere. A first tire 14A is entering the input chamber 86 through the input chamber gate 76 and a second tire 14B is on the input conveyor 72.

Figure 8:
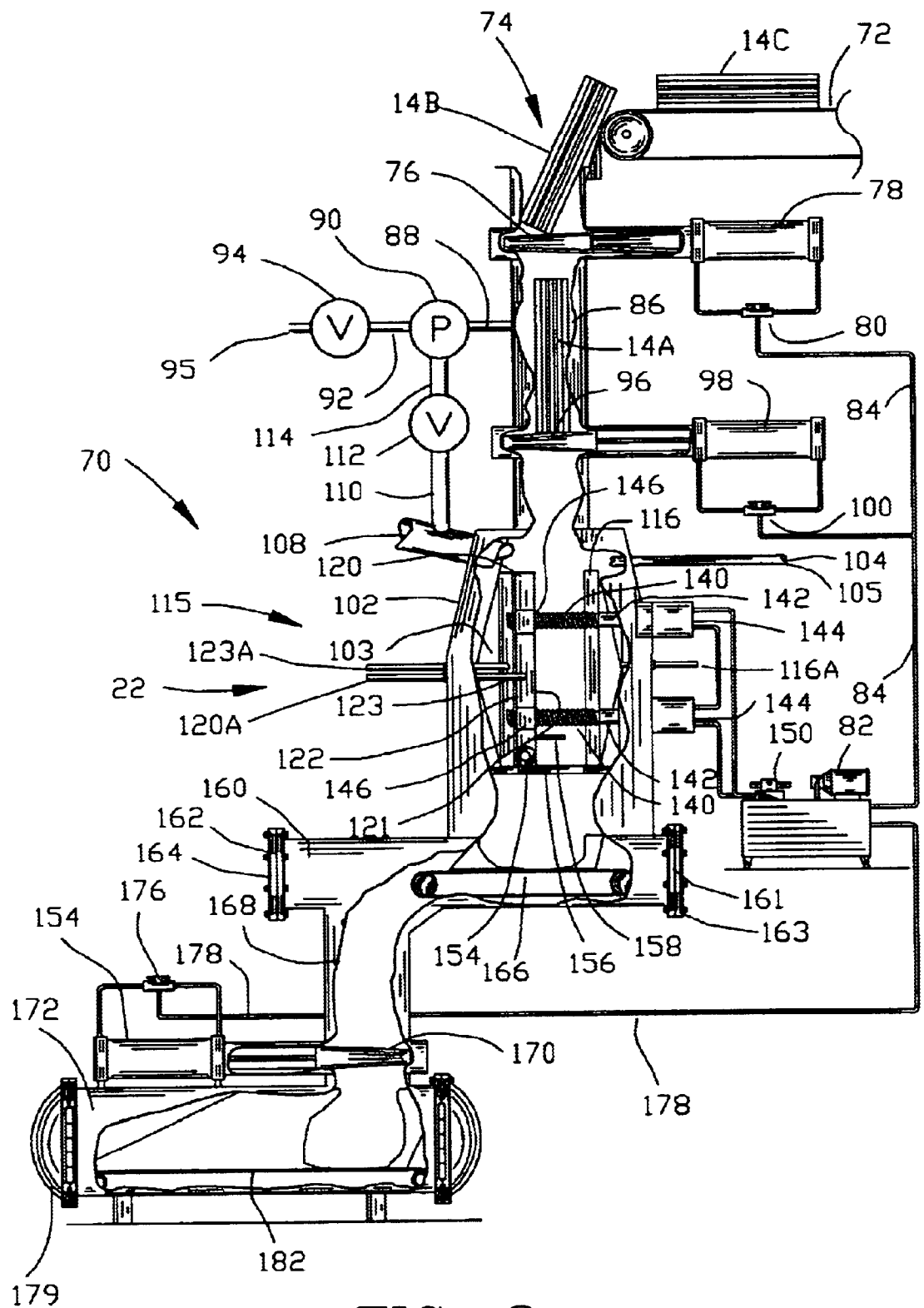
FIG. 8 is a partially cutaway side view of the apparatus illustrating the first tire enclosed in the input chamber, the second tire proximate the input chamber gate, and a third tire on the input conveyor.

FIG. 8 illustrates the input chamber gate 76 being closed for enclosing the first tire 14A within the input chamber 86. The second tire 14B is located proximate to the input chamber gate 76. A third tire 14C is disposed on the input conveyor 72. The vacuum pump 90 is activated and the solenoid valve 94 is opened to evacuate air from the input chamber 86.

Figure 9:
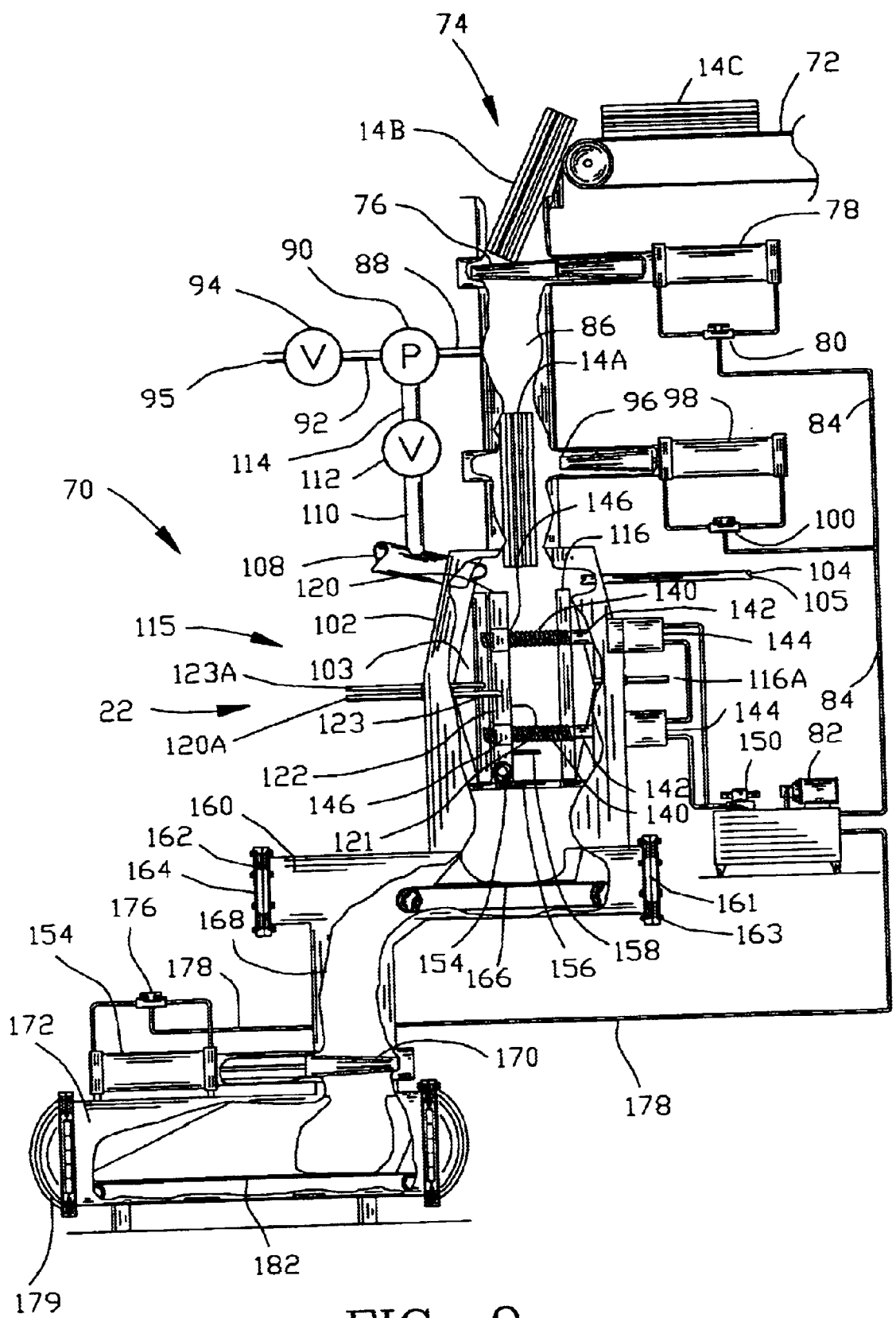
FIG. 9 is a partially cutaway side view of the apparatus illustrating the first tire entering the reactor through a reactor entry gate, the second tire proximate the input chamber gate, and a third tire on the input conveyor.

FIG. 9 illustrates the reactor input gate 96 being opened for enabling the first tire 14A to enter the reactor 22. The second tire 14B is located proximate to the input chamber gate 76. The third tire 14C is located on the input conveyor 72.

Figure 10:
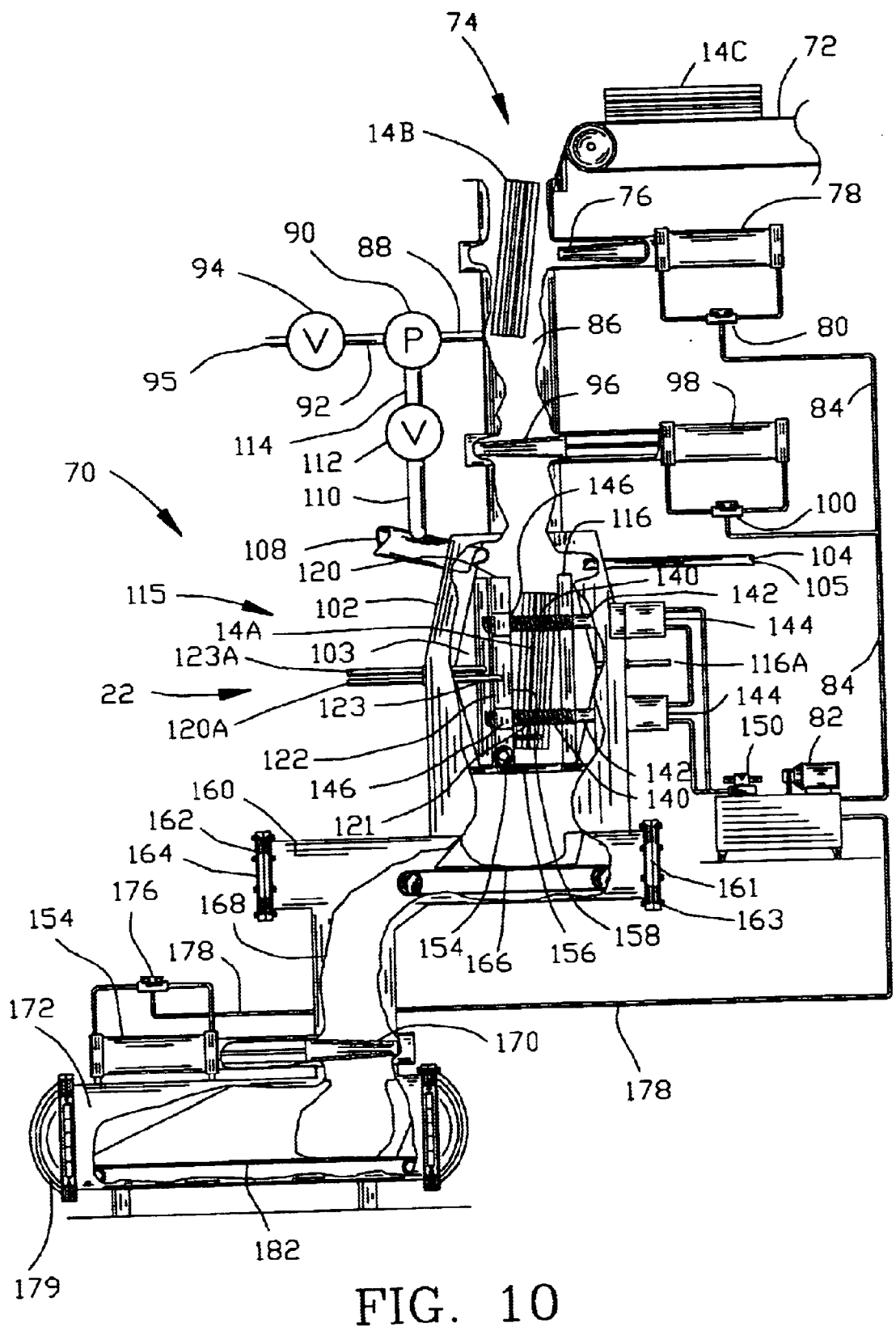
FIG. 10 is a partially cutaway side view of the apparatus illustrating the first tire having entered a first reactor position, the second tire entering the input chamber through the input chamber gate and the third tire on the input conveyor.

FIG. 10 illustrates the reactor input gate 96 being closed for enclosing the first tire 14A within the reactor 22. The first tire 14A is located within a first reactor position within the reactor 22.

The input chamber gate 76 is opened to vent to the atmosphere and the second tire 14B is entering the input chamber 86 through the input chamber gate 76. The third tire 14C is disposed on the input conveyor 72.

Figure 11:
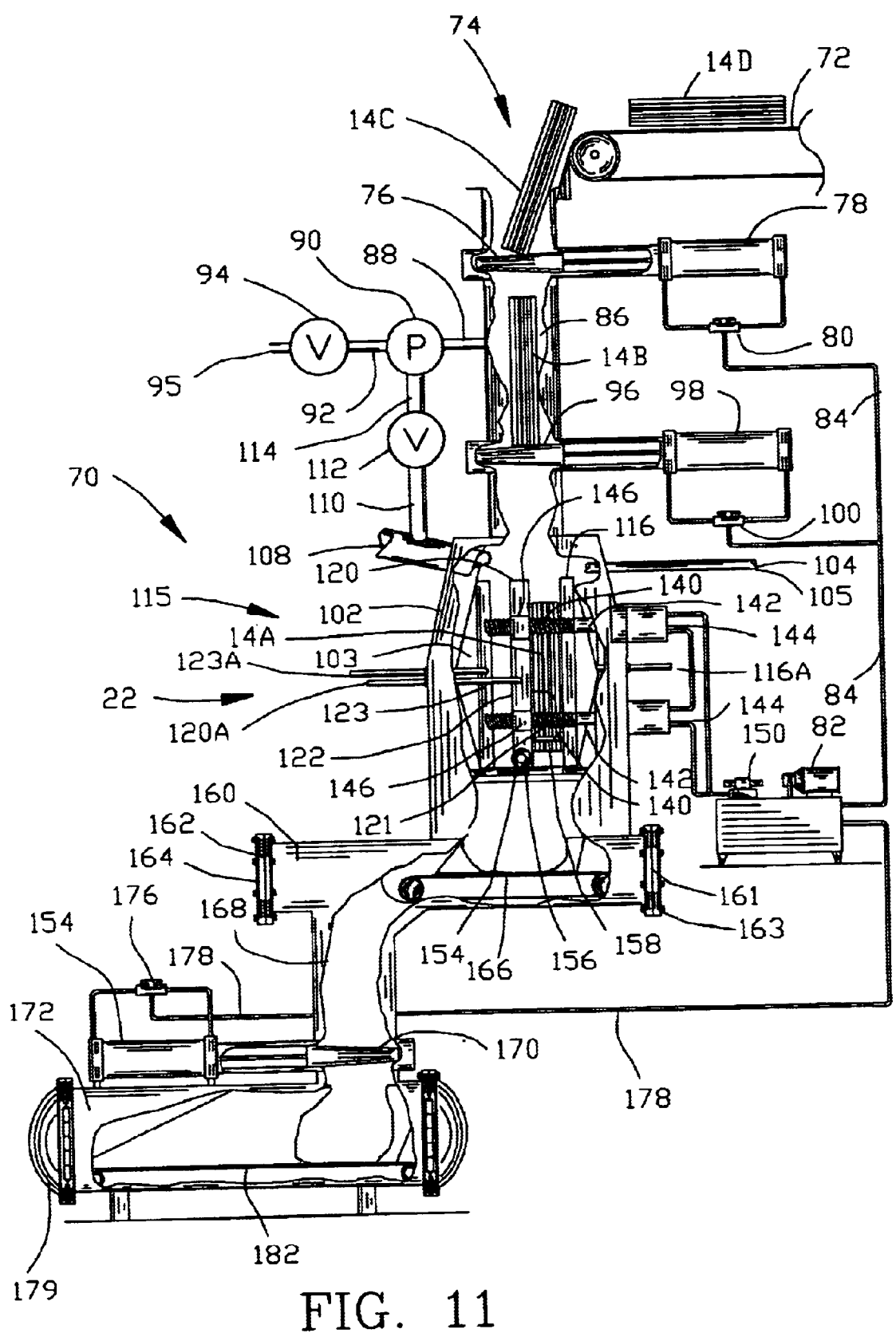
FIG. 11 is a partially cutaway side view of the apparatus illustrating the first tire in the first reactor position beginning compression, the second tire enclosed in the input chamber, the third tire proximate the input chamber gate, and a fourth tire on the input conveyor.

FIG. 11 illustrates the first tire 14A in the first reactor position between the first fixed platen 116 and the moveable platen 120 within the reactor 22. The movement of the moveable platen 120 toward the first fixed platen 116 simultaneously applies mechanical pressure and heat to the rubber tire 14A.

The first tire 14A is simultaneously compressed and heated between the moveable platen 120 and the first fixed platen 116 to a temperature sufficient to pyrolyze the first tire 14A. The movement of the movable platen 120 toward the first fixed platen 116 applies a substantially continuous mechanical pressure on the tire during the reduction of the volume of the first tire 14A during the continuous pyrolysis thereof.

The input chamber gate 76 is closed for enclosing the second tire 14B within the input chamber 86. The vacuum pump 90 is activated and the solenoid valve 94 is opened to evacuate air from the input chamber 86. The third tire 14C is located proximate to the input chamber gate 76. A fourth tire 14D is located on the input conveyor 72.

Figure 12:
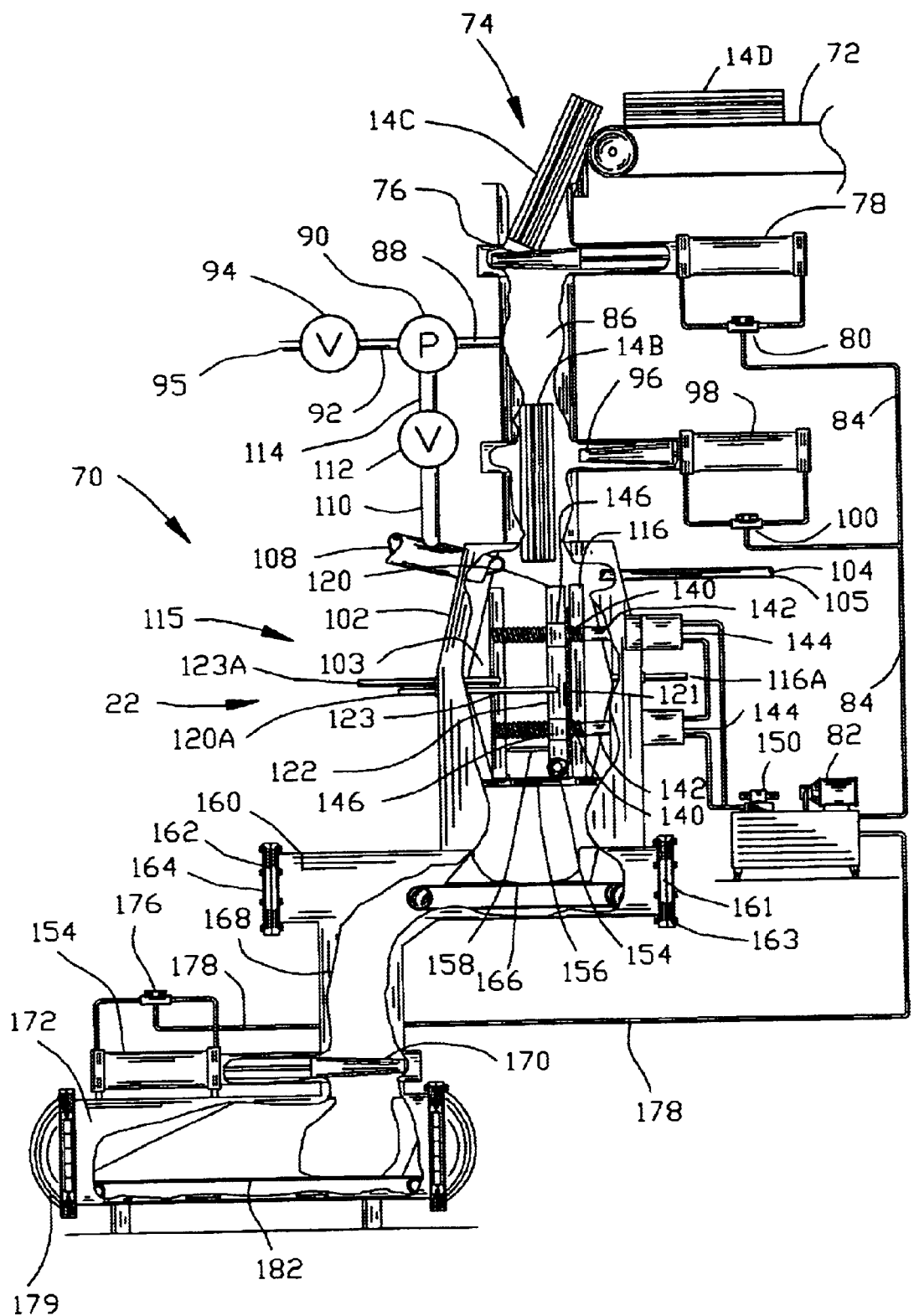
FIG. 12 is a partially cutaway side view of the apparatus illustrating the first tire in the first reactor position fully compressed, the second tire entering the reactor through the reactor entry gate, the third tire proximate the input chamber gate, and the fourth tire on the input conveyor.

FIG. 12 illustrates the first tire 14A in the first reactor position between the first fixed platen 116 and the moveable platen 120 being fully compressed. The process 10 produces volatile products 42 and non-volatile residue 44 within the reactor 22. The volatile products 42 are removed from the reactor 22 through the vapor withdrawal port 108.

The reactor input gate 96 is opened for enabling the second tire 14B to enter the reactor 22. The third tire 14C is located proximate to the input chamber gate 76. The fourth tire 14D is disposed on the input conveyor 72.

The reactor input gate 96 is then closed and the vacuum pump 90 is activated and the solenoid valve 112 is opened to evacuate volatile pyrolysis products 42 from the input chamber 86.

Figure 13:
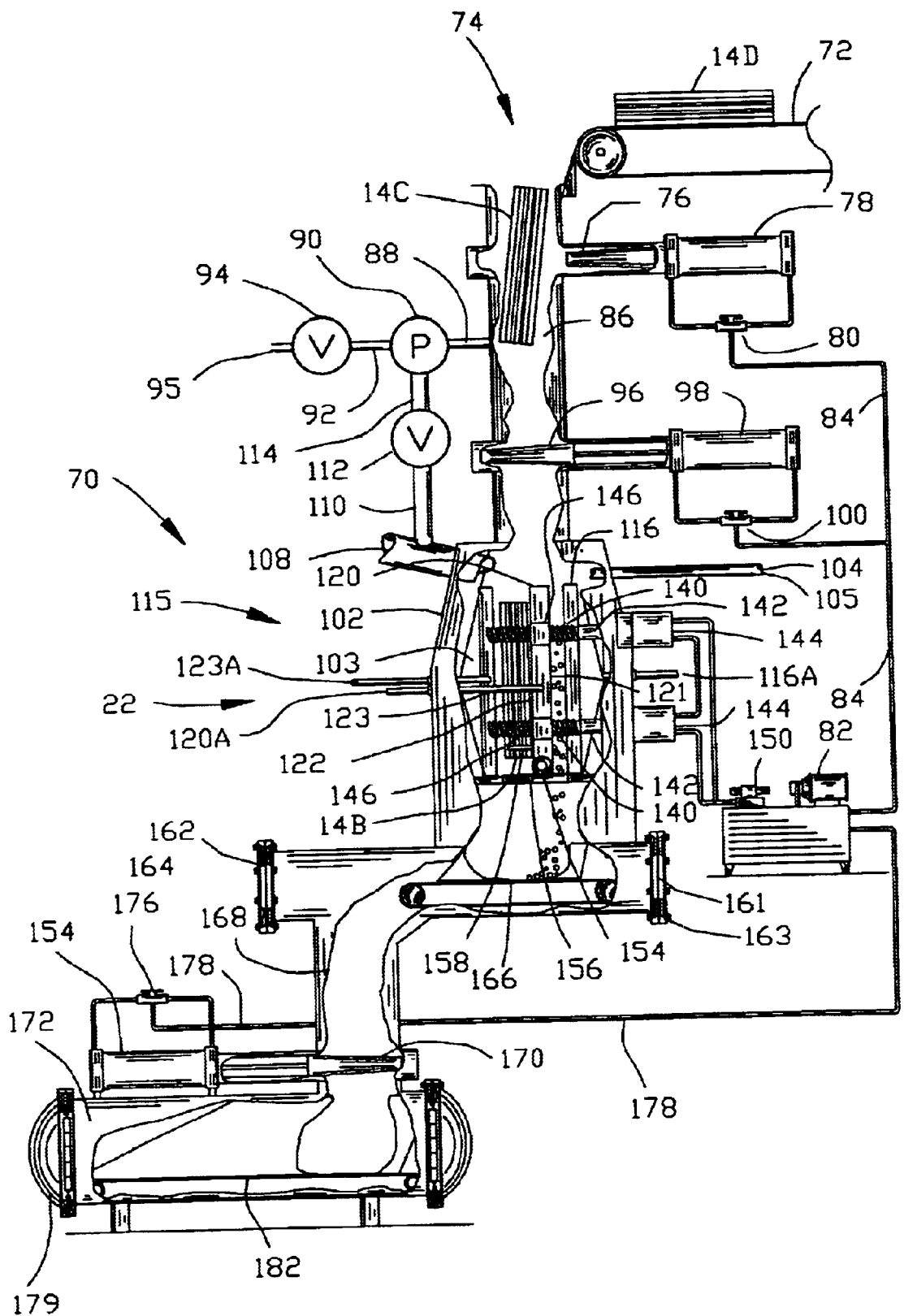
FIG. 13 is a partially cutaway side view of the apparatus illustrating the pyrolysis residue of the first tire exiting the first reactor position onto the residue conveyor, the second tire having entered the second reactor position, the third tire entering the input chamber through the input chamber gate, and the fourth tire on the input conveyor.

FIG. 13 illustrates the pyrolysis residue 44 of the first tire 14A exiting the first reactor position between the first fixed platen 116 and the moveable platen 120 within the reactor 22 onto the residue conveyor 166. The second tire 14B is in a second reactor position between the second fixed platen 123 and the moveable platen 120 within the reactor 22.

The input chamber gate 76 is opened to vent to the atmosphere and the third tire 14C is entering the input chamber 86 through the input chamber gate 76. The fourth tire 14D is located on the input conveyor 72.

Figure 14:
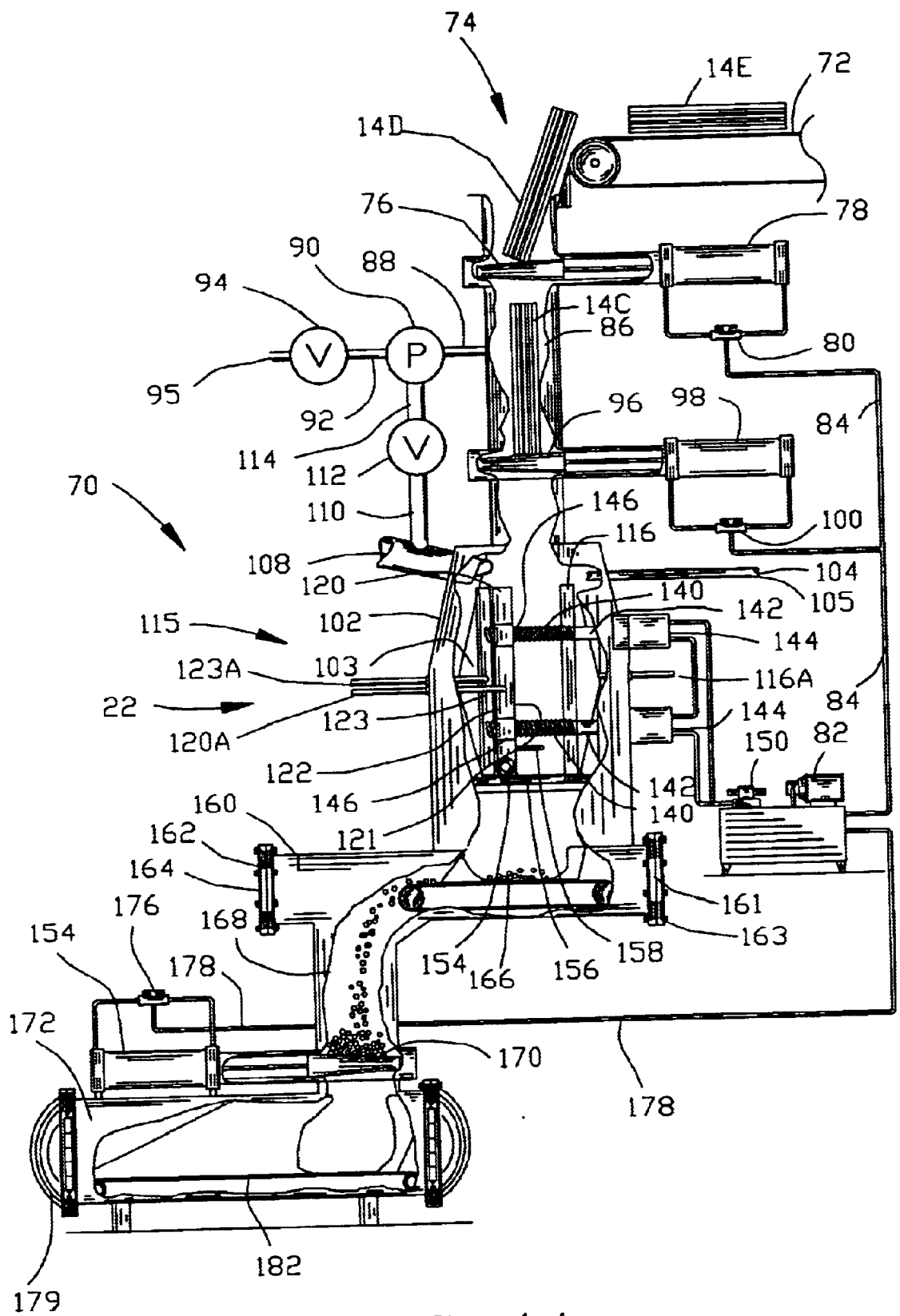
FIG. 14 is a partially cutaway side view of the apparatus illustrating the pyrolysis residue of the first tire on the residue conveyor and entering an accumulator, the second tire being fully compressed in the second reactor position, the third tire enclosed in the input chamber, the fourth tire proximate the input chamber gate and a fifth tire on the input conveyor.

FIG. 14 illustrates the pyrolysis residue 44 of the first tire 14A on the residue conveyor 166 and entering the accumulator 168. The second tire 14B is fully compressed in the second reactor position between the second fixed platen 123 and the moveable platen 120 within the reactor 22.

The input chamber gate 76 is closed to enclose the third tire 14C within the input chamber 86. The vacuum pump 90 is activated and the solenoid valve 94 is opened to evacuate air from the input chamber 86. The fourth tire 14D is located proximate to the input chamber gate 76. A fifth tire 14E is disposed on the input conveyor 72.

Figure 15:
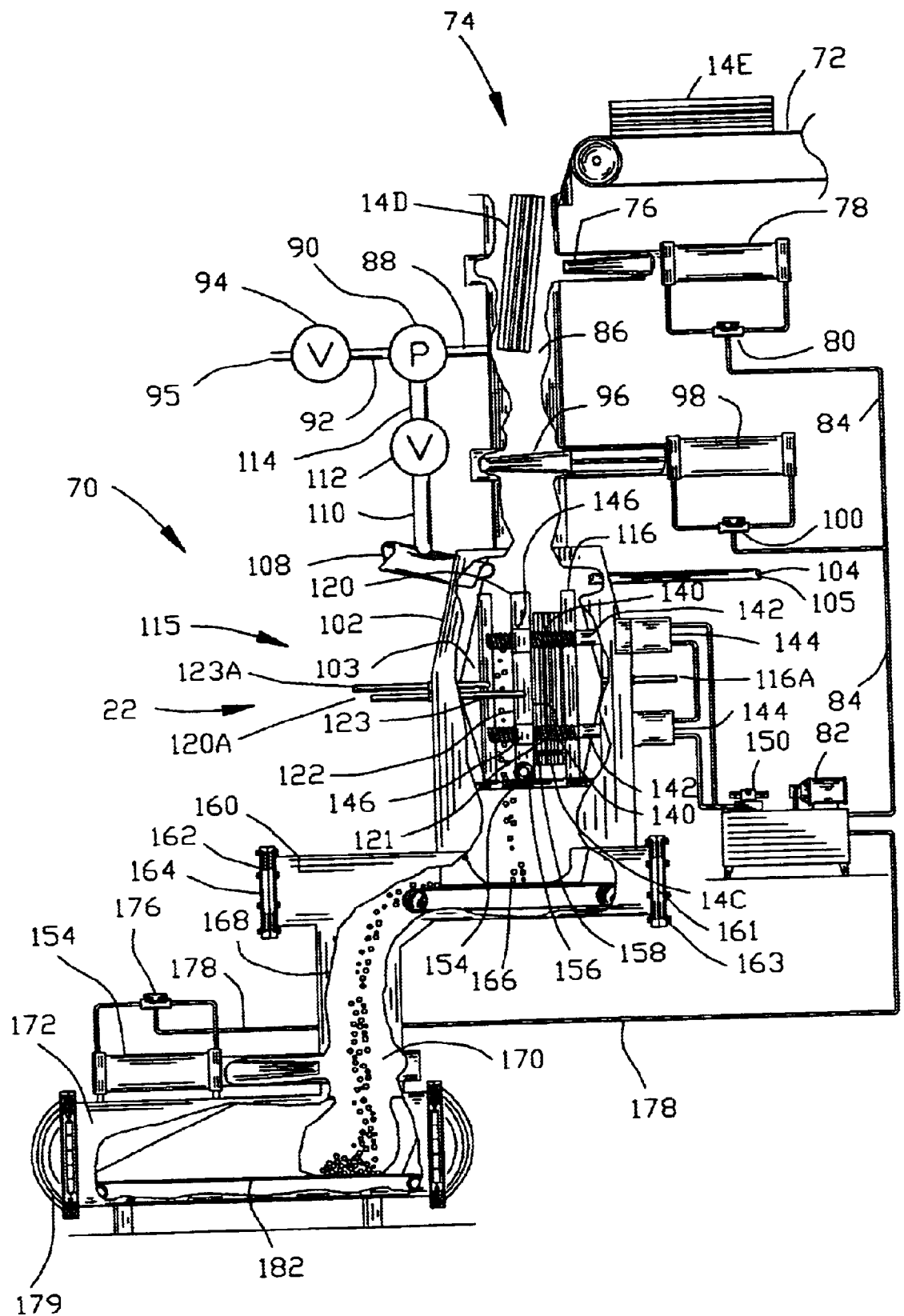
FIG. 15 is a partially cutaway side view of the apparatus illustrating the pyrolysis residue of the second tire exiting the second reactor position, on the residue conveyor and passing through an accumulator and an accumulator gate into the residue removal chamber, the third tire in the first reactor position beginning compression, the fourth tire entering the input chamber through the input chamber gate, and the fifth tire on the input conveyor.

FIG. 15 illustrates the pyrolysis residue 44 of the second tire 14B exiting the second reactor position between the second fixed platen 123 and the moveable platen 120 within the reactor 22 onto the residue conveyor 166 and passing through an accumulator 168 and the accumulator gate into the residue removal chamber 172.

The third tire 14C is located within the first reactor position between the first fixed platen 116 and the moveable platen 120 within the reactor 22. The movement of the moveable platen 120 toward the first fixed platen 116 simultaneously applies mechanical pressure and heat to the rubber tire 14C.

Previously, the reactor input gate 96 was closed and the vacuum pump 90 was activated and the solenoid valve 112 is opened to evacuate volatile pyrolysis products 42 from the input chamber 86. The input chamber gate 76 is opened to vent to the atmosphere and the fourth tire 14D enters the input chamber 86 through the input chamber gate 76. The fifth tire 14E is located on the input conveyor 72.

Figure 16:
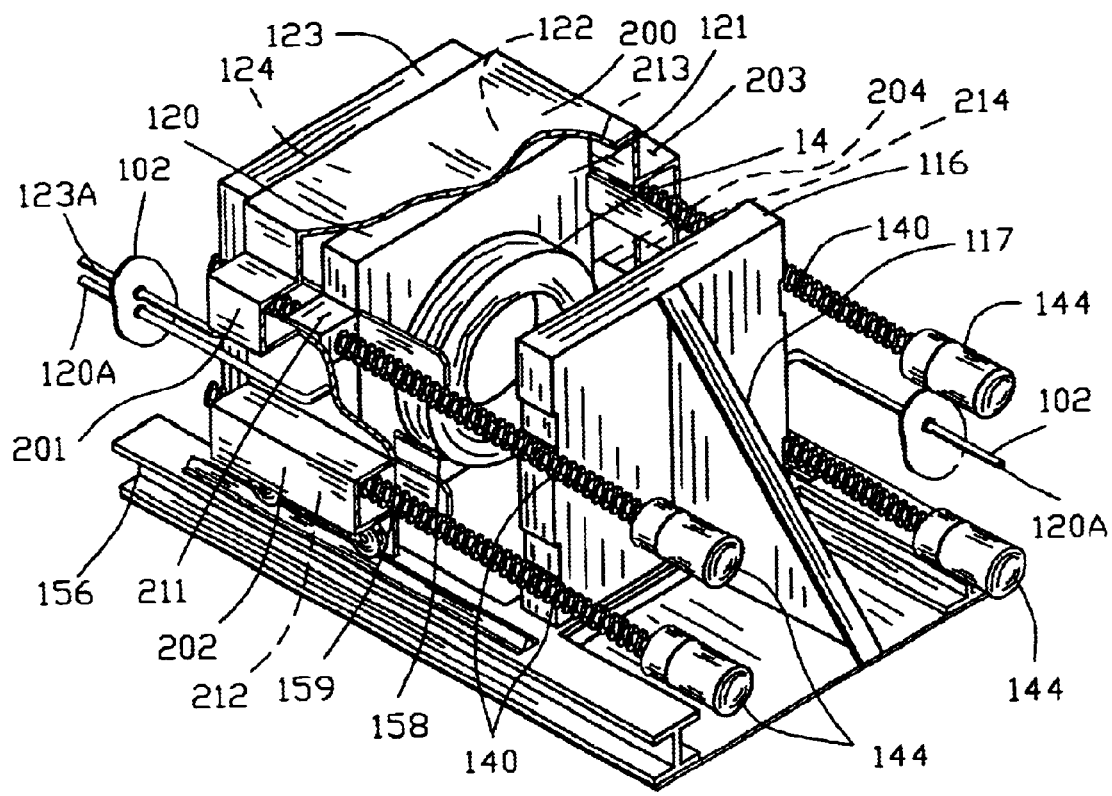
FIG. 16 is an isometric view similar to FIG. 5 illustrating an optional tire retainer shown in a second operative position covering the space between the moveable platen and a second fixed platen.

FIG. 16 is an isometric view similar to FIG. 5 illustrating an optional tire retainer 200 shown in a second operative position covering the space between the moveable platen 120 and the second fixed platen 123. The tire retainer 200 includes a plurality of channels 201–204 for slidably engaging a plurality of bosses 211–214 extending from the moveable platen 120. The slidable engagement of the plurality of channels 201–204 on the plurality of bosses 211–214 makes the tire retainer 200 independently movable relative to the moveable platen 120. The tire retainer 200 is driven by conventional means (not shown).

Figure 17:
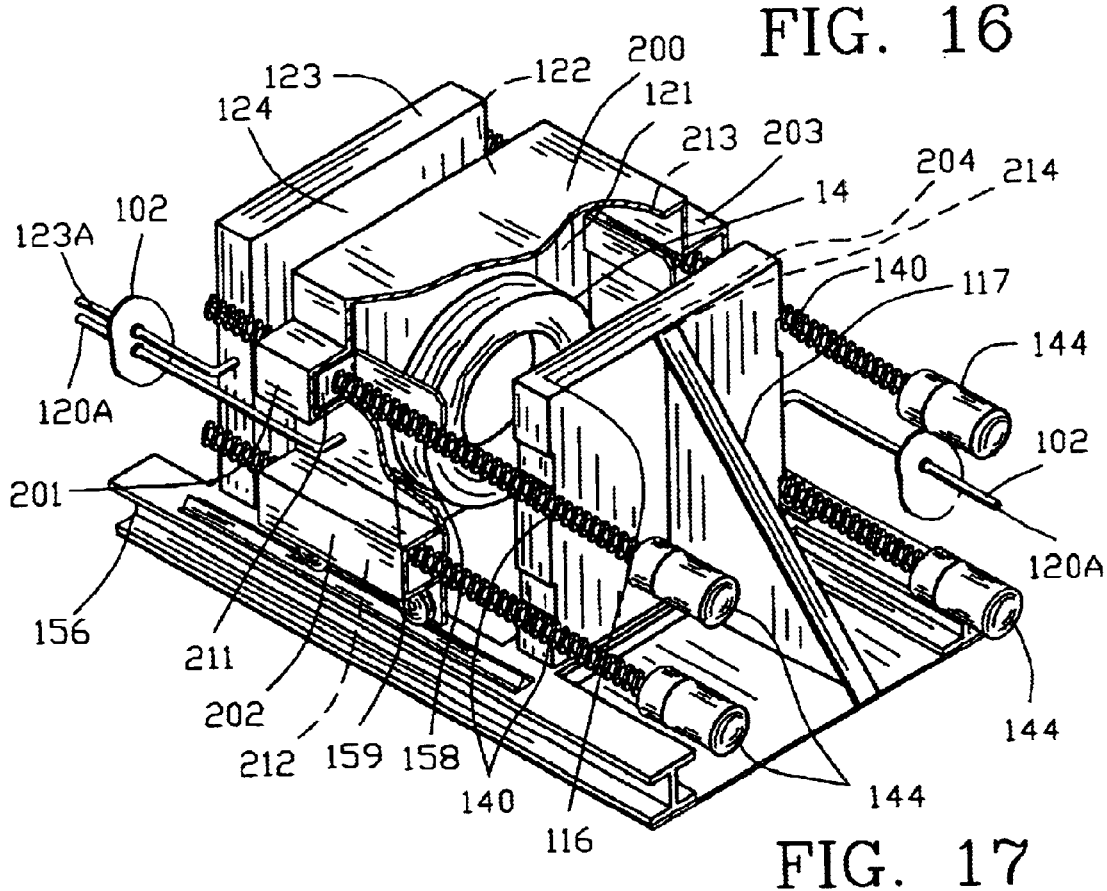
FIG. 17 is a view similar to FIG. 16 illustrating the movement of the optional tire retainer along with the moveable platen.

FIG. 17 is a view similar to FIG. 16 illustrating the movement of the optional tire retainer 200 along with the moveable platen 120. The optional tire retainer 200 is shown moving concurrently with the moveable platen 120.

Figure 18:
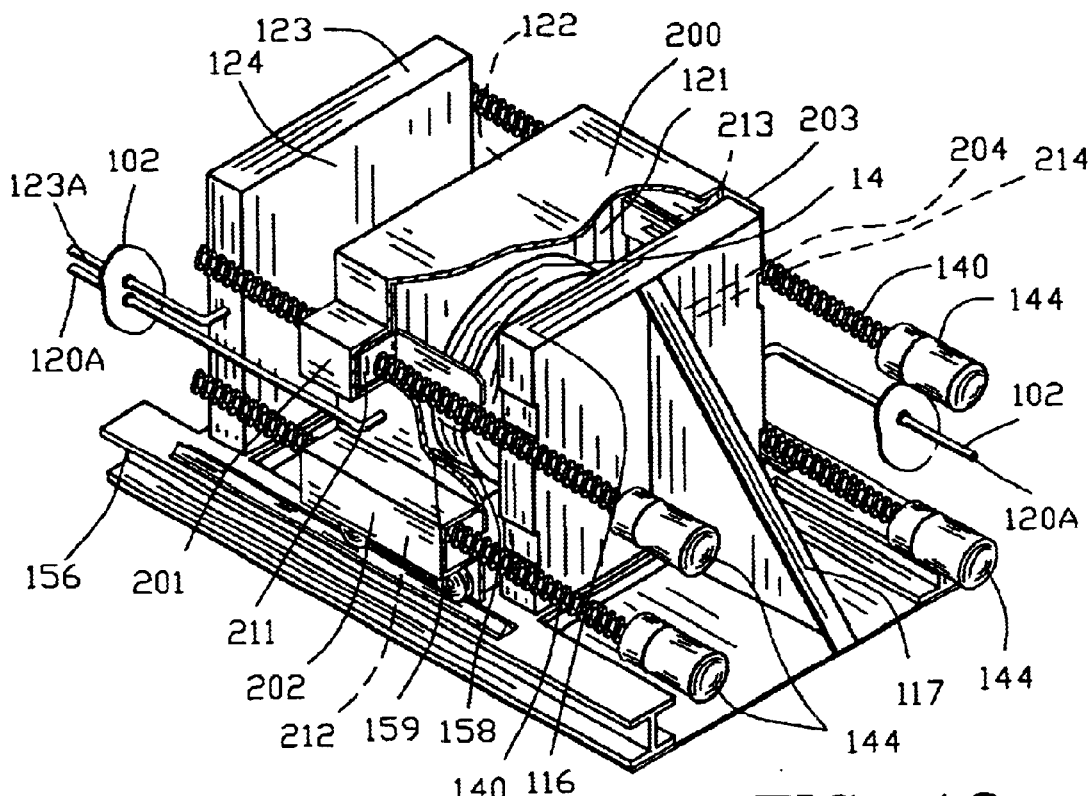
FIG. 18 is a view similar to FIG. 17 illustrating the continued movement of the optional tire retainer with the moveable platen.

FIG. 18 is a view similar to FIG. 17 illustrating the continued movement of the optional tire retainer 200 with the moveable platen 120. As the moveable platen 120 entraps the tire 14 between the moveable platen 120 and the first fixed platen 116, the optional tire retainer 200 continues to move to cover the space between the moveable platen 120 and a first fixed platen 116.

Figure 19:
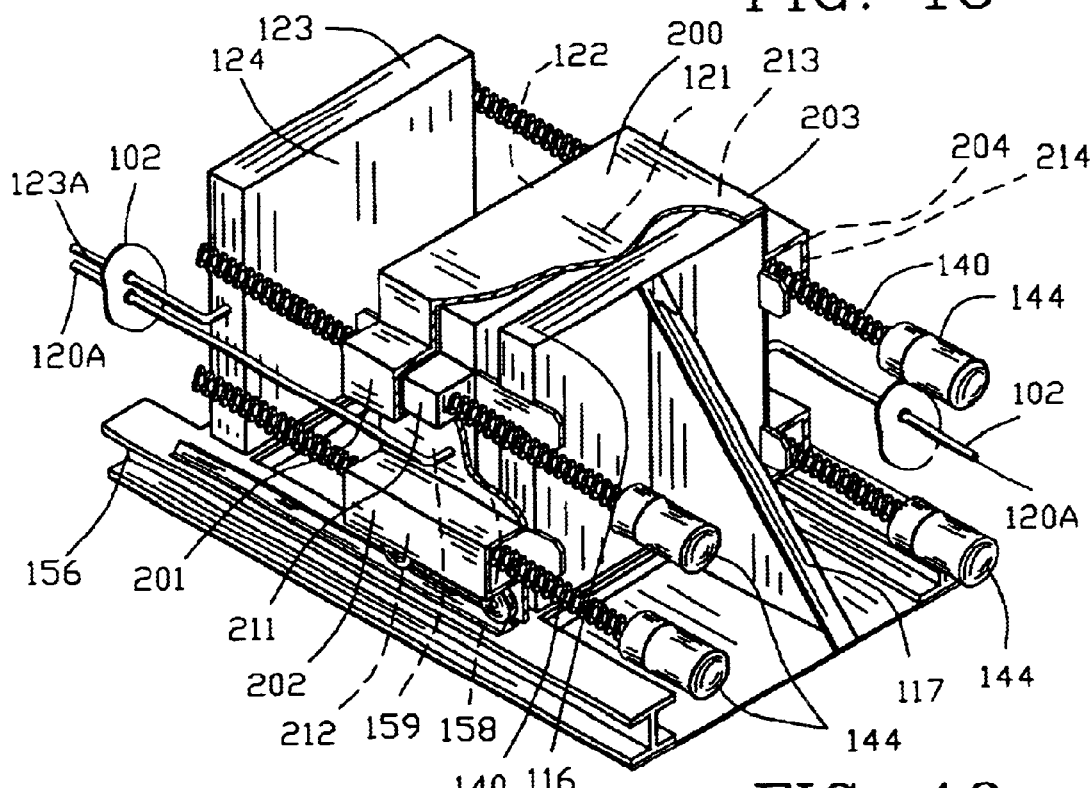
FIG. 19 is a view similar to FIG. 18 illustrating the optional tire retainer shown in a first operative position covering the space between the moveable platen and a first fixed platen.

FIG. 19 is a view similar to FIG. 18 illustrating the optional tire retainer 200 shown in a first operative position covering the space between the moveable platen 120 and the first fixed platen 116. The optional tire retainer 200 retains the tire 14 or portions thereof between the moveable platen 120 and the first fixed platen 116 as the tire 14 liquifies under the simultaneous pressure and temperature.

Figure 20:
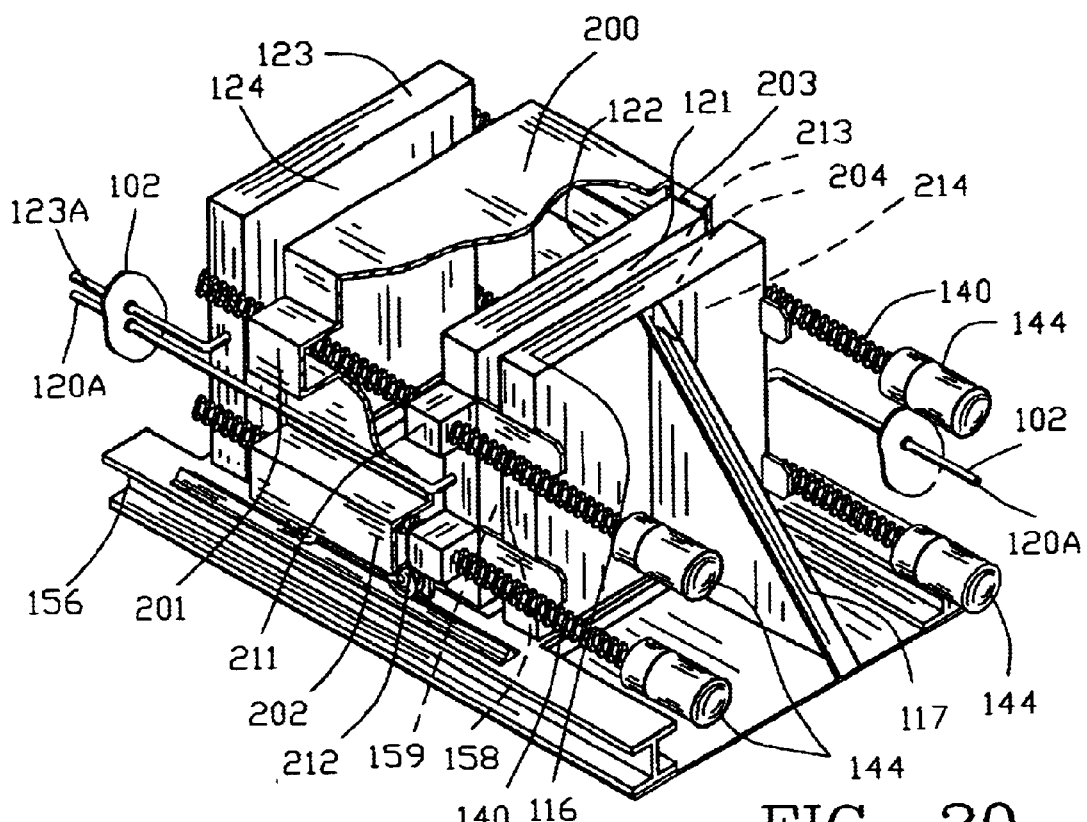
FIG. 20 is a view similar to FIG. 19 illustrating a reverse movement of the optional tire retainer along with the moveable platen.

FIG. 20 is a view similar to FIG. 19 illustrating a reverse movement of the optional tire retainer 200 along with the moveable platen 120. After the tire 14 between the moveable platen 120 and the first fixed platen 116 has been processed, the optional tire retainer 200 moves with the moveable platen 120 to process another tire between the moveable platen 120 and the second fixed platen 123.

Figure 6:
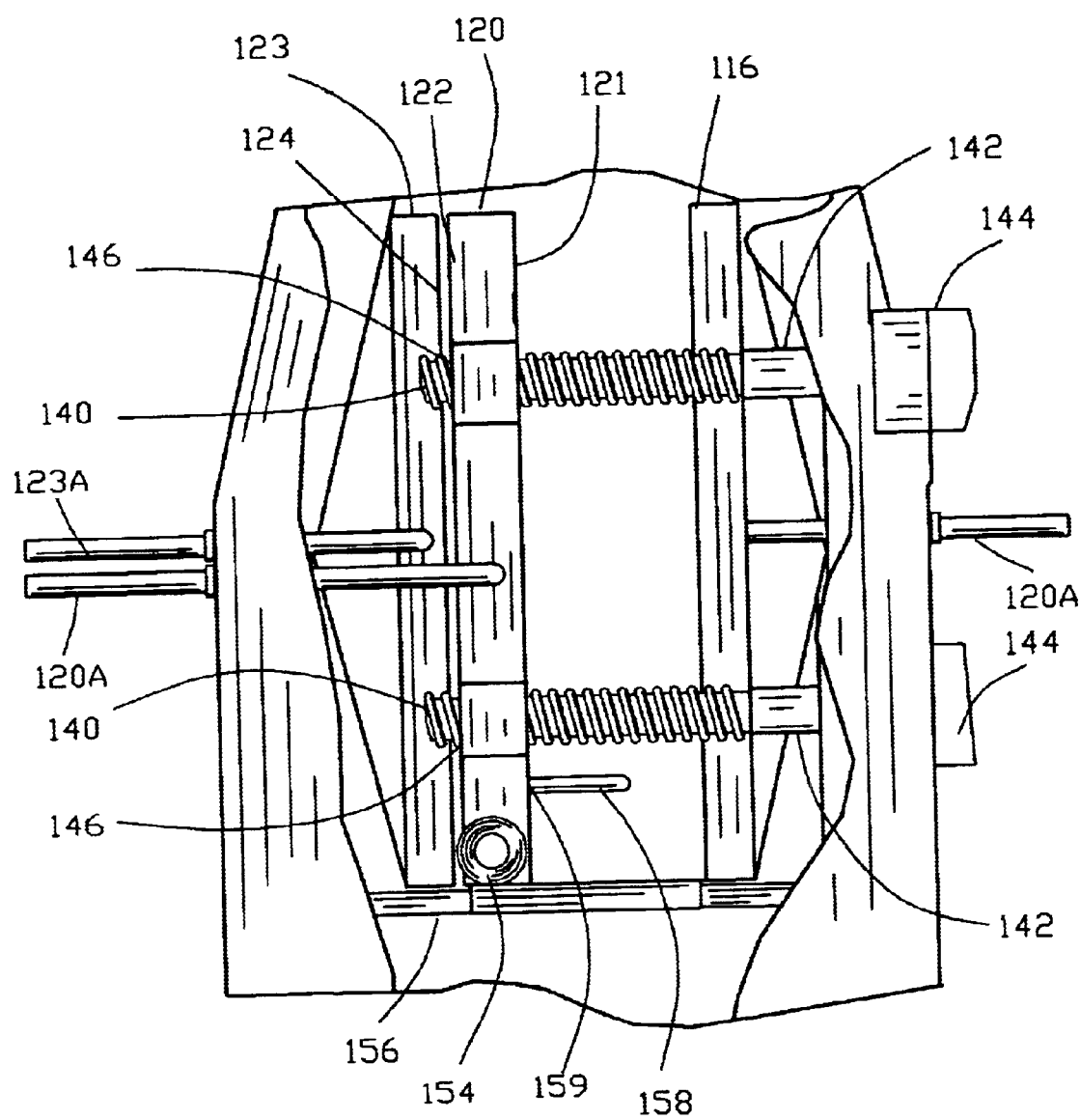
FIG. 6 is an enlarged view of a portion of FIG. 2 illustrating the electrical connection to the moveable heated platen.
Figure 21:
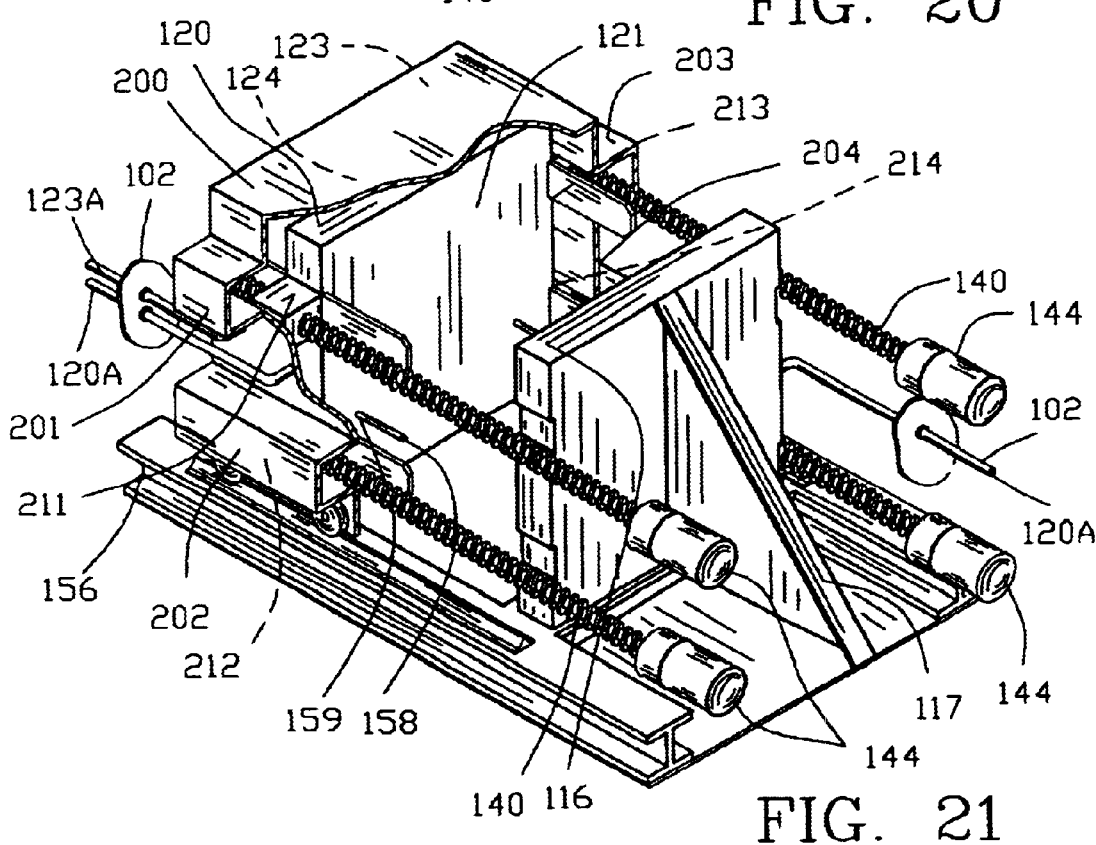
FIG. 21 is a view similar to FIG. 6 illustrating the optional tire retainer returned to the second operative position covering the space between the moveable platen and a second fixed platen.

FIG. 21 is a view similar to FIG. 6 illustrating the optional tire retainer 200 returned to the second operative position covering the space between the moveable platen 120 and a second fixed platen 123. The optional tire retainer 200 retains the tire 14 or portions thereof between the moveable platen 120 and the second fixed platen 123 as the tire 14 liquifies under the simultaneous pressure and temperature.

A significant part of the present invention is the application of heat in direct compression of the material to be pyrolyzed and as the process progresses. This direct compression of the material is achieved by maintaining substantially constant contact with the material remaining after partial pyrolyzing. The present invention provides an improved apparatus and method for reclaiming volatile products and non-volatile residue that is environmentally non-destructive with substantially no environmental release of atmospheric pollutants. The invention provides an improved apparatus and method for reclaiming volatile products and non-volatile residue through the pyrolysis of a polymeric material which retains a portion of the volatile products for providing energy for operating the process making the process efficient and economical to operate. The improved apparatus and method can be automated thereby requiring minimum human intervention into the process.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method for reclaiming volatile products and non-volatile residue through the pyrolysis of a volume of polymeric material in a reactor having an input chamber and a residue removal chamber affixed thereto, comprising:

placing a first volume of polymeric material in the input chamber;

evacuating the input chamber;

establishing an initial oxygen deficient atmosphere in the reactor;

transferring the first volume of polymeric material from the input chamber into the reactor;

placing the first volume of polymeric material in the reactor between a first and a second surface;

heating at least one of the first and the second surfaces;

linearly moving at least one of the first and the second surfaces toward one another to simultaneously compress and heat the first volume of polymeric material to a temperature sufficient to pyrolyze the first volume of polymeric material to reduce the volume of the first volume of polymeric material and to produce volatile products and non-volatile residue;

the continuing linear movement of at least one of the first and the second surfaces toward one another continuing to further compress and heat the reduced volume of the first volume of polymeric material to further reduce the reduced volume of the first volume of polymeric material and to produce additional volatile products and non-volatile residue until essentially all of the first volume of polymeric material is transformed into volatile products and non-volatile residue;

linearly moving at least one of the first and the second surfaces away from one another for removing the non-volatile residue from the reactor;

retaining a portion of the volatile products within the reactor for maintaining the oxygen deficient atmosphere in the reactor;

removing a portion of the volatile products from the reactor;

transferring the non-volatile products from the reactor into the residue removal chamber;

placing a second volume of polymeric material in the input chamber;

evacuating the input chamber; and transferring the second volume of polymeric material from the input chamber into the reactor thereby continuing the pyrolysis of a second volume of polymeric material.

2. A method for reclaiming volatile products and non-volatile residue as set forth in claim 1, wherein the step of establishing the oxygen deficient atmosphere in the reactor comprises displacing oxygen by introducing a substantially non-reactive gas.

3. A method for reclaiming volatile products and non-volatile residue as set forth in claim 1, wherein the volume of polymeric material comprises a substantial portion of a rubber tire.

4. A method for reclaiming volatile products and non-volatile residue as set forth in claim 1, wherein the volume of polymeric material comprises an inorganically filled polymeric object.

5. A method for reclaiming volatile products and non-volatile residue as set forth in claim 1, wherein the step of simultaneously compressing and heating the volume of polymeric material includes compressing the volume of polymeric material with a continuous mechanical pressure between 400 pounds per square inch and 600 pounds per square inch.

6. A method for reclaiming volatile products and non-volatile residue as set forth in claim 1, wherein the step of simultaneously compressing and heating the substantial portion of polymeric material includes heating the volume of polymeric material to temperature of one thousand two hundred degrees Fahrenheit.

7. A method for reclaiming volatile products and non-volatile residue through the pyrolysis of an intact rubber tire in a reactor having an input chamber and a residue removal chamber affixed thereto, comprising:

placing a first intact rubber tire in the input chamber;

evacuating the input chamber;

establishing an initial oxygen deficient atmosphere in the reactor by first evacuating the reactor and then purging the reactor through the introduction of a substantially non-reactive gas;

transferring the first intact rubber tire from the input chamber into the reactor;

placing the intact rubber tire in the reactor between a first and a second surface;

heating at least one of the first and the second surfaces;

linearly moving at least one of the first and the second surfaces toward one another to simultaneously compress and heat the intact rubber tire to a temperature sufficient to pyrolyze the intact rubber fire to reduce the volume of the rubber tire and to produce volatile products and non-volatile residue;

the continuing linear movement of at least one of the first and the second surfaces toward one another continuing to further compress and heat the reduced volume of the rubber tire to further reduce the reduced volume of the rubber tire and to produce additional volatile products and non-volatile residue until essentially all of the rubber tire is transformed into volatile products and non-volatile residue;

linearly moving at least one of the first and the second surfaces away from one another for removing the non-volatile residue from the reactor;

retaining a portion of the volatile products within the reactor for maintaining the oxygen deficient atmosphere in the reactor;

removing a portion of the volatile products from the reactor;

transferring the non-volatile products from the reactor into the residue removal chamber;

placing a second intact rubber tire in the input chamber;

evacuating the input chamber; and transferring the second intact rubber tire from the input chamber into the reactor thereby continuing the pyrolysis of a second intact rubber tire.

8. A method for reclaiming volatile products and non-volatile residue as set forth in claim 7, wherein the step of a establishing the oxygen deficient atmosphere in the reactor comprises displacing oxygen by introducing a substantially non-reactive gas.

9. A method for reclaiming volatile products and non-volatile residue as set forth in claim 7, wherein the step of simultaneously compressing and heating the intact rubber tire includes compressing the intact rubber tire with a continuous mechanical pressure between 400 pounds per square inch and 600 pounds per square inch.

10. A method for reclaiming volatile products and non-volatile residue as set forth in claim 7, wherein the step of simultaneously compressing and heating the intact rubber tire includes heating the intact rubber tire to temperature of one thousand two hundred degrees Fahrenheit.

* * * * *